US012234668B2

(12) United States Patent
Hoiland et al.

(10) Patent No.: US 12,234,668 B2
(45) Date of Patent: Feb. 25, 2025

(54) EXIT DEVICE ASSEMBLY

(71) Applicant: Schlage Lock Company LLC, Carmel, IN (US)

(72) Inventors: Eric Hoiland, Carmel, IN (US); Michael D. Coleman, Noblesville, IN (US); Manjunath Shetty, Udupi (IN)

(73) Assignee: Schlage Lock Company LLC, Carmel, IN (US)

(*) Notice: Subject to any disclaimer, the term of this patent is extended or adjusted under 35 U.S.C. 154(b) by 427 days.

(21) Appl. No.: 17/336,607

(22) Filed: Jun. 2, 2021

(65) Prior Publication Data

US 2022/0389740 A1 Dec. 8, 2022

(51) Int. Cl.

| | |
|---|---|
| ***E05B 41/00*** | (2006.01) |
| ***E05B 9/00*** | (2006.01) |
| ***E05B 65/10*** | (2006.01) |
| *E05B 57/00* | (2006.01) |

(52) U.S. Cl.
CPC ................ *E05B 41/00* (2013.01); *E05B 9/00* (2013.01); *E05B 65/1053* (2013.01); *E05B 57/00* (2013.01)

(58) Field of Classification Search
CPC ........ E05B 41/00; E05B 9/00; E05B 65/1053; E05B 17/226; E05B 39/00; E05B 15/0053
See application file for complete search history.

(56) References Cited

U.S. PATENT DOCUMENTS 289,196 A * 11/1883 Welsh ..................... E05B 41/00 40/907
391,215 A * 10/1888 Vail ......................... E05B 41/00 40/907
481,960 A * 9/1892 Lindstrom .............. E05B 41/00 40/907
(Continued)

FOREIGN PATENT DOCUMENTS

FR 355225 A * 10/1905
GB 191424308 A * 7/1915

OTHER PUBLICATIONS

New-2SI; 7 pages.
(Continued)

*Primary Examiner* — Christine M Mills
*Assistant Examiner* — Faria F Ahmad
(74) *Attorney, Agent, or Firm* — Taft Stettinius & Hollister LLP

(57) ABSTRACT

An indicator assembly according to certain embodiments generally includes a mounting bracket, a follower, a transmission ring, and an indicator plate. The follower is rotatably mounted to the mounting bracket, and is configured to receive a tailpiece of an input device. The transmission ring is rotatably mounted to the mounting bracket, and is engaged with the follower. The indicator plate is slidably mounted to the mounting bracket for movement between a first indicator plate position and a second indicator plate position to selectively place a first indicium of the indicator plate within a reference area. The transmission ring is operably connected with the indicator plate such that movement of the transmission ring between a first transmission ring position and a second transmission ring position drives the indicator plate between the first indicator plate position and the second indicator plate position.

24 Claims, 13 Drawing Sheets

(56) References Cited

U.S. PATENT DOCUMENTS

| | | | | | |
|---|---|---|---|---|---|
| 624,278 | A * | 5/1899 | Whaley | E05B 41/00 40/907 |
| 689,429 | A * | 12/1901 | Smith | E05B 41/00 40/907 |
| 1,066,664 | A * | 7/1913 | Senior | E05B 41/00 40/907 |
| 1,081,190 | A * | 12/1913 | Arita | E05B 41/00 40/907 |
| 1,099,106 | A * | 6/1914 | Wevat | E05B 41/00 40/907 |
| 1,171,287 | A * | 2/1916 | Waschau | E05B 41/00 40/907 |
| 1,749,649 | A * | 3/1930 | Rolph | E05B 41/00 70/438 |
| 2,455,208 | A * | 11/1948 | Wirth | E05B 41/00 40/907 |
| 2,565,669 | A * | 8/1951 | Smith | E05B 41/00 40/907 |
| 4,490,999 | A * | 1/1985 | Castle | E05B 41/00 70/330 |
| 4,559,796 | A * | 12/1985 | De, Sr. | E05B 41/00 70/432 |
| 4,895,400 | A * | 1/1990 | Harding | E05C 1/04 292/145 |
| 9,169,669 | B2 | 10/2015 | Clary et al. | |
| 9,187,928 | B2 | 11/2015 | Abel et al. | |
| 9,273,495 | B2 | 3/2016 | Tien | |
| 9,435,141 | B2 | 9/2016 | Tien | |
| 9,845,620 | B2 * | 12/2017 | Bronner | E05B 63/0017 |
| 11,486,163 | B2 * | 11/2022 | Sweeney | E05B 41/00 |
| 2010/0064744 | A1 * | 3/2010 | Miller | E05B 47/0676 70/315 |
| 2015/0167354 | A1 | 6/2015 | Tien | |
| 2015/0225982 | A1 * | 8/2015 | Bronner | E05B 63/0017 70/432 |
| 2018/0245373 | A1 | 8/2018 | Lacy et al. | |
| 2019/0368226 | A1 * | 12/2019 | Sweeney | E05B 41/00 |
| 2020/0248480 | A1 | 8/2020 | Arlinghaus et al. | |
| 2020/0408002 | A1 | 12/2020 | Woodley et al. | |
| 2021/0164267 | A1 * | 6/2021 | Holtgrewe | E05B 65/1046 |
| 2021/0310278 | A1 * | 10/2021 | Hood | E05B 41/00 |
| 2021/0372162 | A1 * | 12/2021 | Clifford | E05B 47/0038 |

OTHER PUBLICATIONS

International Search Report; International Searching Authority; International Patent Application No. PCT/US2022/031946; Oct. 26, 2022; 4 pages.

Written Opinion of the International Searching Authority; International Searching Authority; International Patent Application No. PCT/US2022/031946; Oct. 26, 2022; 7 pages.

* cited by examiner

EXIT DEVICE ASSEMBLY

TECHNICAL FIELD

The present disclosure generally relates to exit device assemblies, and more particularly but not exclusively relates to status-indicating exit device assemblies.

BACKGROUND

Certain exit device assemblies generally include a pushbar assembly, an outside trim, and a latch mechanism operably connected with the pushbar assembly and the trim. The pushbar assembly is installed to an egress side of a door, and is operable to actuate the latch mechanism for egress from a room. The outside trim is installed to a non-egress side of the door, and is at least selectively operable to actuate the latch mechanism for entry to the room. Certain exit device assemblies include locking mechanisms by which the outside trim can be selectively prevented from actuating the latch mechanism, and some such assemblies further include visual indicators by which the locked/unlocked state of the outside trim can be discerned from within the room.

Many existing exit device assemblies suffer from one or more drawbacks or limitations. For example, the locking mechanisms of some conventional exit device assemblies occupy the space adjacent a driver of the pushbar assembly, and prevent the attachment of a connector by which the pushbar assembly can be connected to a remote latch mechanism, thereby inhibiting the use of the locking mechanism in a vertical exit device assembly. For these reasons among others, there remains a need for further improvements in this technological field.

SUMMARY

An indicator assembly according to certain embodiments generally includes a mounting bracket, a follower, a transmission ring, and an indicator plate. The follower is rotatably mounted to the mounting bracket, and is configured to receive a tailpiece of an input device. The transmission ring is rotatably mounted to the mounting bracket, and is engaged with the follower. The indicator plate is slidably mounted to the mounting bracket for movement between a first indicator plate position and a second indicator plate position to selectively place a first indicium of the indicator plate within a reference area. The transmission ring is operably connected with the indicator plate such that movement of the transmission ring between a first transmission ring position and a second transmission ring position drives the indicator plate between the first indicator plate position and the second indicator plate position. Further embodiments, forms, features, and aspects of the present application shall become apparent from the description and figures provided herewith.

DETAILED DESCRIPTION OF ILLUSTRATIVE EMBODIMENTS

Figure 2:
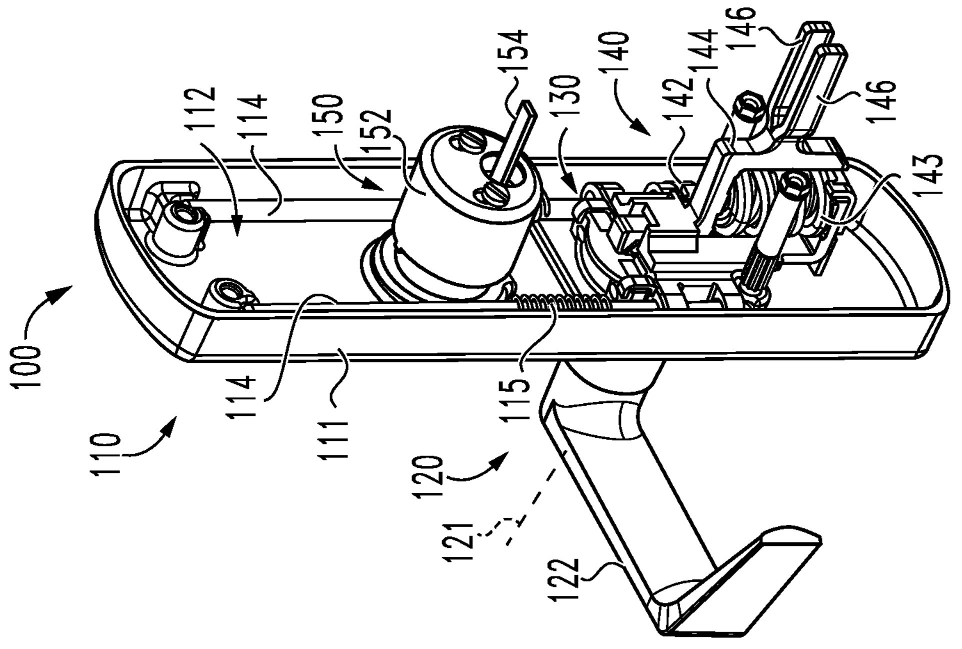
FIG. 2 is a perspective illustration of a trim according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a “preferred” component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms “longitudinal,” “lateral,” and “transverse” are used to denote motion or spacing along three mutually perpendicular axes, wherein each of the axes defines two opposite directions. In the coordinate system illustrated in the Figures, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
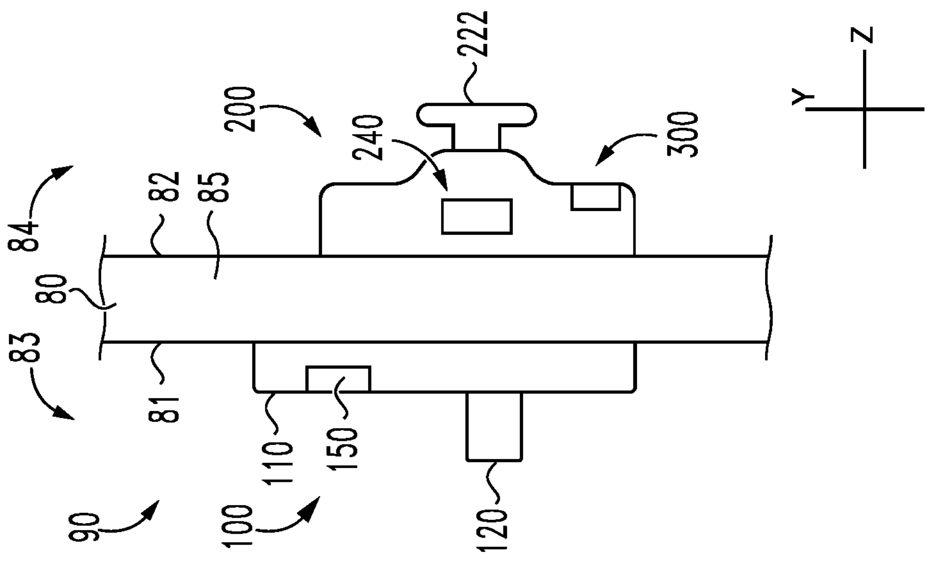
FIG. 1 is a schematic representation of an exit device assembly according to certain embodiments installed to a door.

With reference to FIG. 1, illustrated therein is a door 80 having installed thereon an access control device in the form of an exit device assembly 90 according to certain embodiments. The door 80 generally includes a non-egress side 81 and an egress side 82 opposite the non-egress side 81. When the door 80 is in its closed position, the non-egress side 81 faces an exterior or outer region 83, and the egress side 82 faces an interior or access-controlled region 84. The door 80 also includes a free edge 85 that faces a doorframe when the door 80 is in its closed position. The exit device assembly 90 generally includes a trim 100 installed to the non-egress side 81, a pushbar assembly 200 installed to the egress side 82, and a trim lock device 300 installed to the egress side 82. As described herein, the illustrated pushbar assembly 200 includes a latch mechanism 240 and a pushbar 222 operable to actuate the latch mechanism 240, and the trim 100 is selectively operable to actuate the latch mechanism 240 based upon a locked/unlocked state of the trim lock device 300.

With additional reference to FIG. 2, the trim 100 generally includes an escutcheon 110, a manual actuator 120 rotatably mounted to the escutcheon 110, a cam 130 engaged with the manual actuator 120, and a lift finger assembly 140 engaged with the manual actuator 120 via the cam 130 such that rotation of the manual actuator 120 lifts or causes vertical displacement of the lift finger assembly 140. In certain embodiments, the trim 100 may further include a lock cylinder assembly 150. As described herein, the lift finger assembly 140 extends through the door 80 and is engaged with the pushbar assembly 200 such that rotation of the manual actuator 120 selectively actuates the latch mechanism 240.

The escutcheon 110 is mounted to the non-egress side 81 of the door 80, and includes a housing 111 defining a chamber 112 in which various working components of the trim 100 are seated. The escutcheon 110 further includes a pair of laterally-extending rods 114 on which the lift finger assembly 140 is slidably mounted for movement between a deactuated position and an actuated position. While other forms are contemplated, in the illustrated embodiment, the deactuated position is a vertically lower position and the actuated position is a vertically upper position such that the lift finger assembly 140 is lifted from its deactuated position to its actuated position. The escutcheon 110 may further include a bias member 115 urging the lift finger assembly 140 toward its deactuated position. In the illustrated form, the bias member 115 is provided in the form of one or more compression springs. In other embodiments, the bias member 115 may include additional or alternative biasing features, such as one or more torsion springs, extension springs, elastic members, and/or magnets.

The manual actuator 120 is pivotably mounted to the escutcheon 110, and is operable to laterally drive the lift finger assembly 140 between its deactuated position and its actuated position. In the illustrated form, the manual actuator 120 is rotatable about a transverse axis 121, and is operably connected with the cam 130 such that rotation of the manual actuator 120 causes a corresponding rotation of the cam 130. While the illustrated manual actuator 120 is provided in the form of a lever 122 that rotates about the transverse axis 121 in order to lift the lift finger assembly 140, it is to be appreciated that other forms are contemplated. For example, in certain embodiments, the manual actuator 120 may be provided as a knob that rotates about the transverse axis 121 in order to lift the lift finger assembly 140. In other forms, the manual actuator 120 may be provided in the form of a thumb lever that pivots about a longitudinal axis in order to lift the lift finger assembly 140. Such a thumb lever may be engaged with the lift finger assembly 140 via a cam such as the cam 130, or via other mechanisms.

The cam 130 is rotatably mounted to the escutcheon 110, and is engaged between the manual actuator 120 and the lift finger assembly 140 such that actuation of the manual actuator 120 drives the lift finger assembly 140 from its deactuated position to its actuated position against the biasing force of the bias member 115.

The lift finger assembly 140 generally includes a driving piece 142 engaged with the cam 130, and a driven piece or lift finger 144 engaged with the driving piece 142 via one or more springs 143. The driven piece 144 includes at least one finger 146, and in the illustrated form includes a pair of fingers 146 that extend generally parallel to one another. As described herein, the driven piece 144 extends through the door 80 such that the finger(s) 146 are operable to engage the pushbar assembly 200 and the trim lock device 300. Rotation of the cam 130 drives the driving piece 142 upward against the force of the bias member 115, and the upward motion of the driving piece 142 is transmitted to the driven piece 144 via the one or more springs 143. In the event that the driven piece 144 is prevented from such upward movement, the springs 143 may compress to permit continued motion of the driving piece 142, thereby enabling at least some movement of the manual actuator 120. As described herein, the finger 146 is operable to engage the pushbar assembly 200 and the trim lock device 300 such that movement of the lift finger assembly 140 in an actuating direction (e.g., by the manual actuator 120) actuates the latch mechanism 240 when the trim lock device 300 is in an unlocking state.

The lock cylinder assembly 150 is mounted to the escutcheon 110, and generally includes a lock cylinder 152 and a tailpiece 154 engaged with the lock cylinder 152. As is typical of lock cylinders, the lock cylinder 152 includes a shell, a plug rotatably mounted in the shell, and a tumbler system operable to selectively prevent rotation of the plug relative to the shell. The tailpiece 154 is engaged with the plug such that, upon insertion of a proper key, the key can be rotated to rotate the plug, thereby rotating the tailpiece 154. Such rotation may, for example, actuate a latch control assembly 230 of the pushbar assembly 200 to actuate the latch mechanism 240 in a manner typical of trim-mounted lock cylinders.

Figure 3:
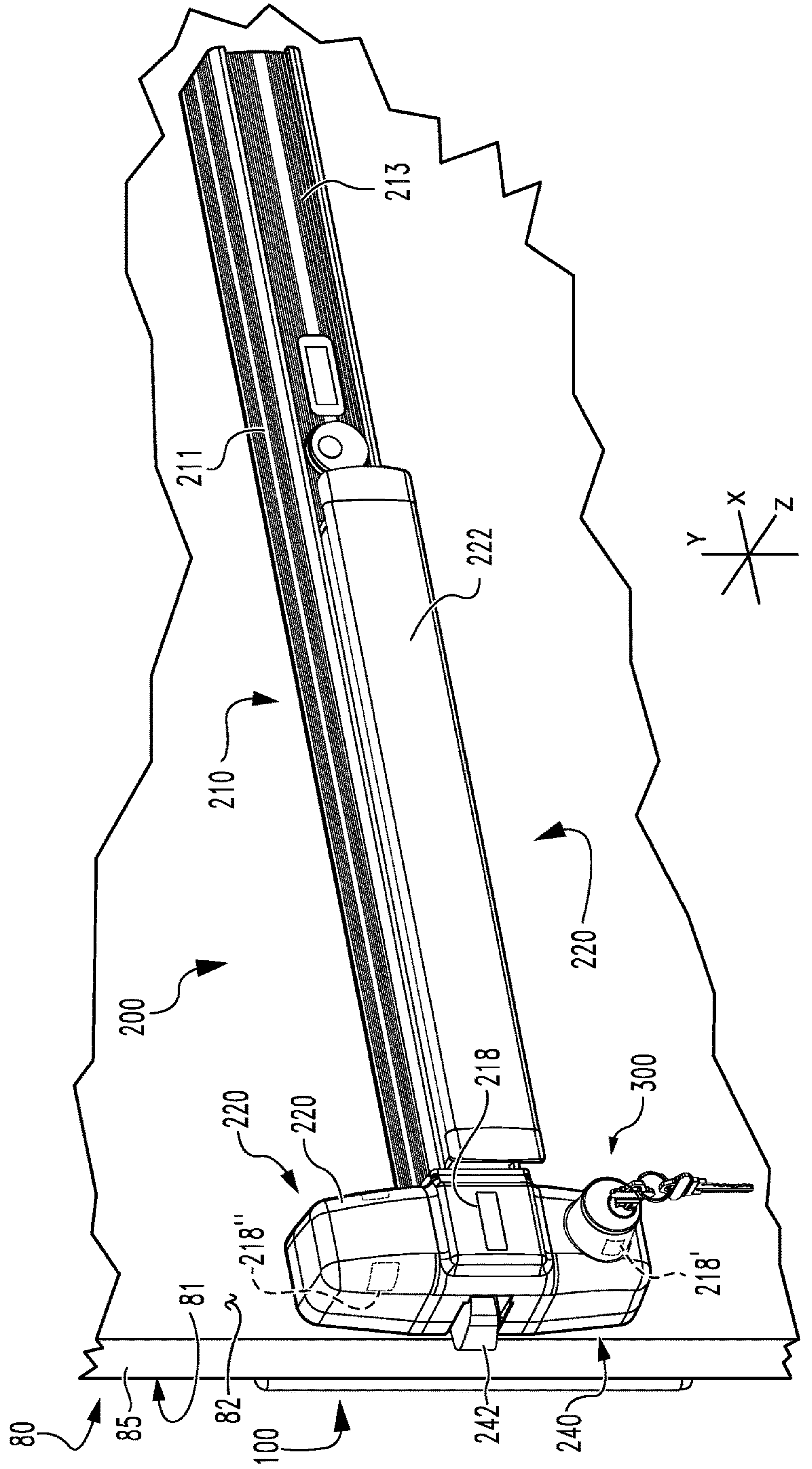
FIG. 3 is a perspective illustration of a pushbar assembly according to certain embodiments installed to a door.
Figure 4:
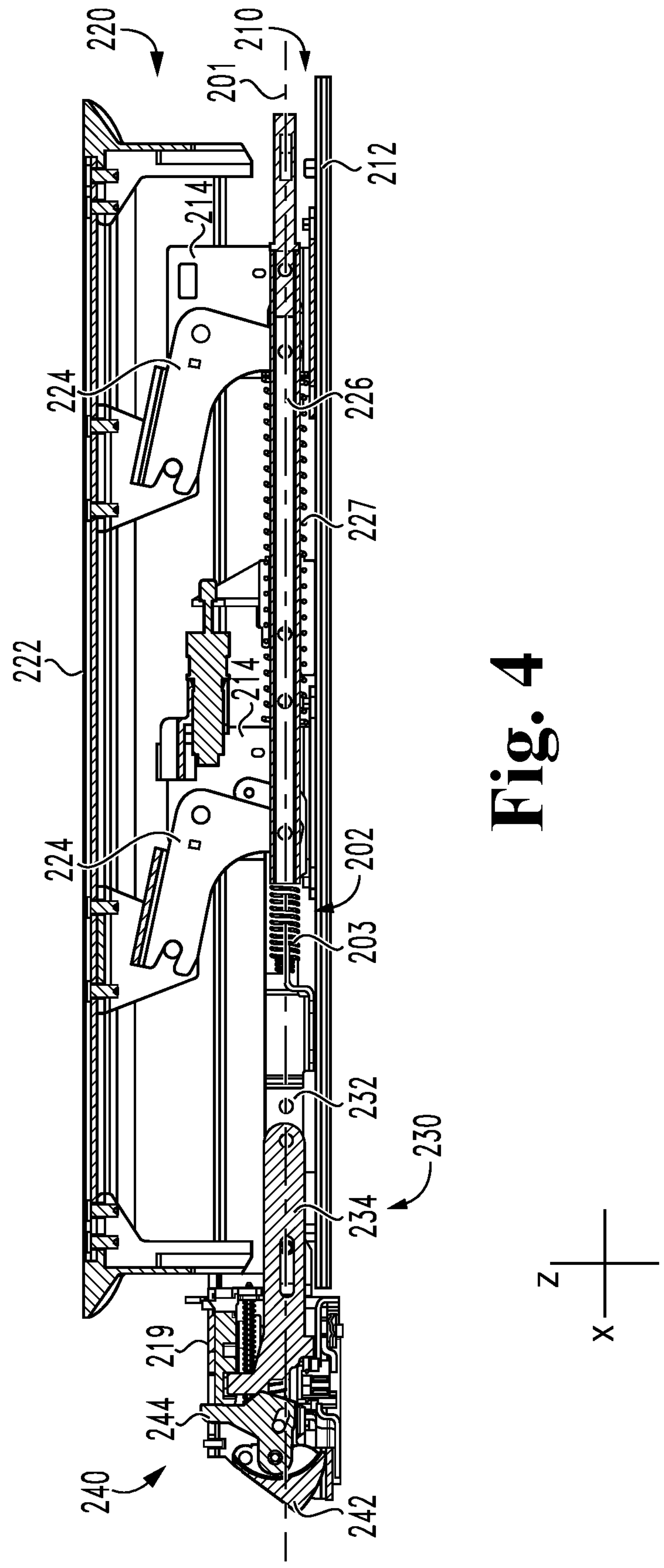
FIG. 4 is a cross-sectional illustration of a portion of the pushbar assembly.
Figure 5:
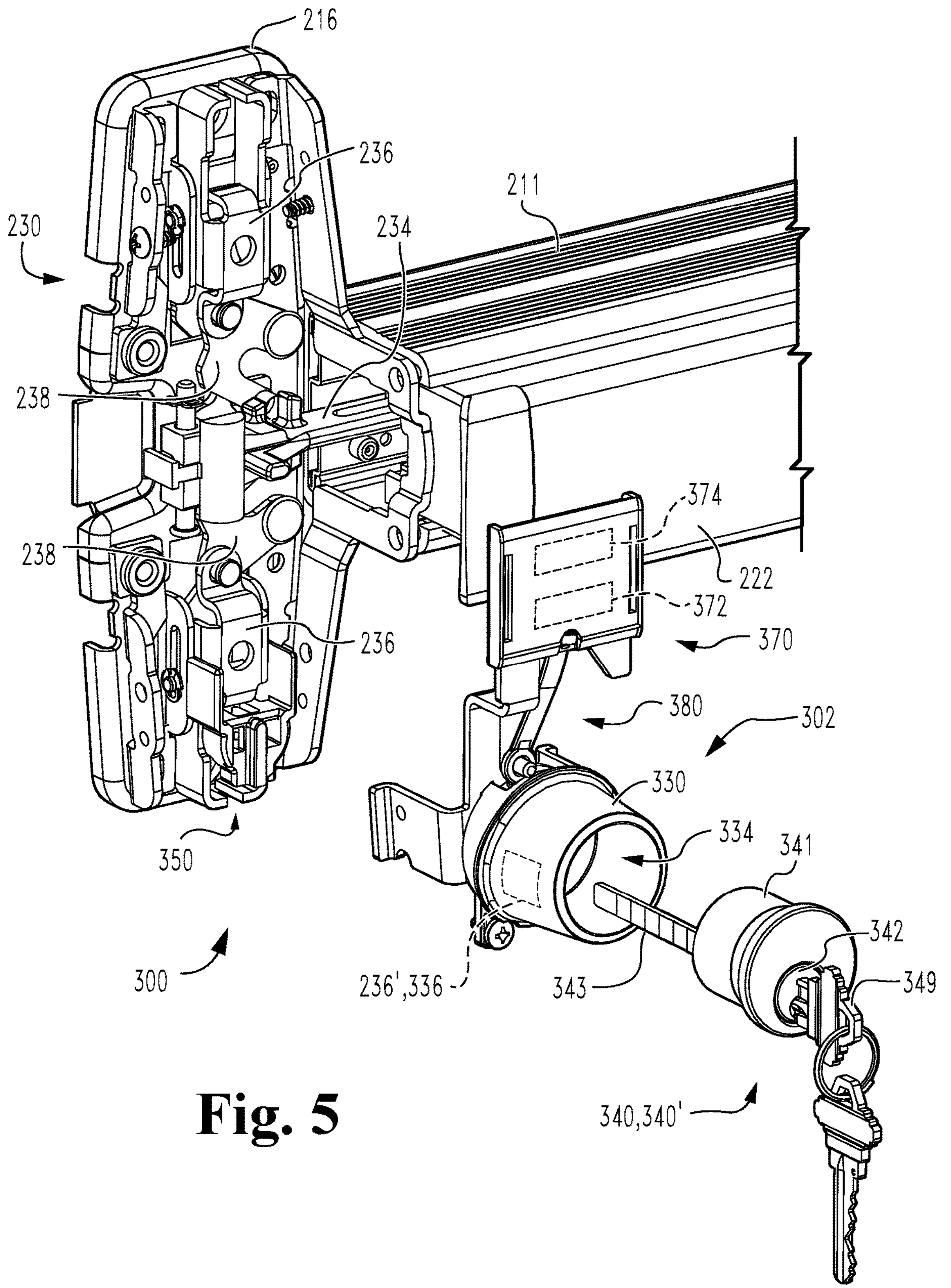
FIG. 5 is an exploded assembly view of a portion of the pushbar assembly.
Figure 6:
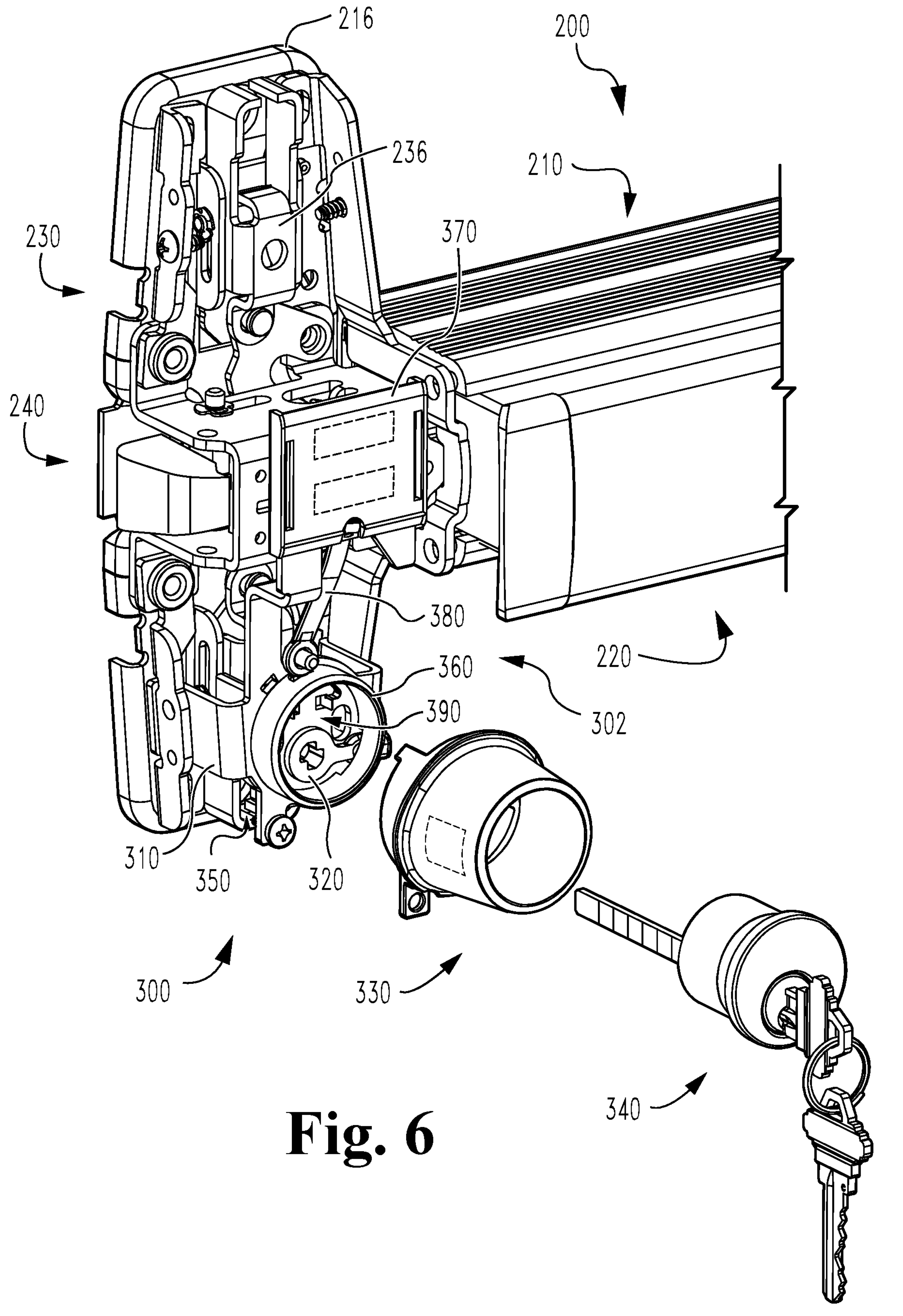
FIG. 6 is another exploded assembly view of a portion of the pushbar assembly.
Figure 7:
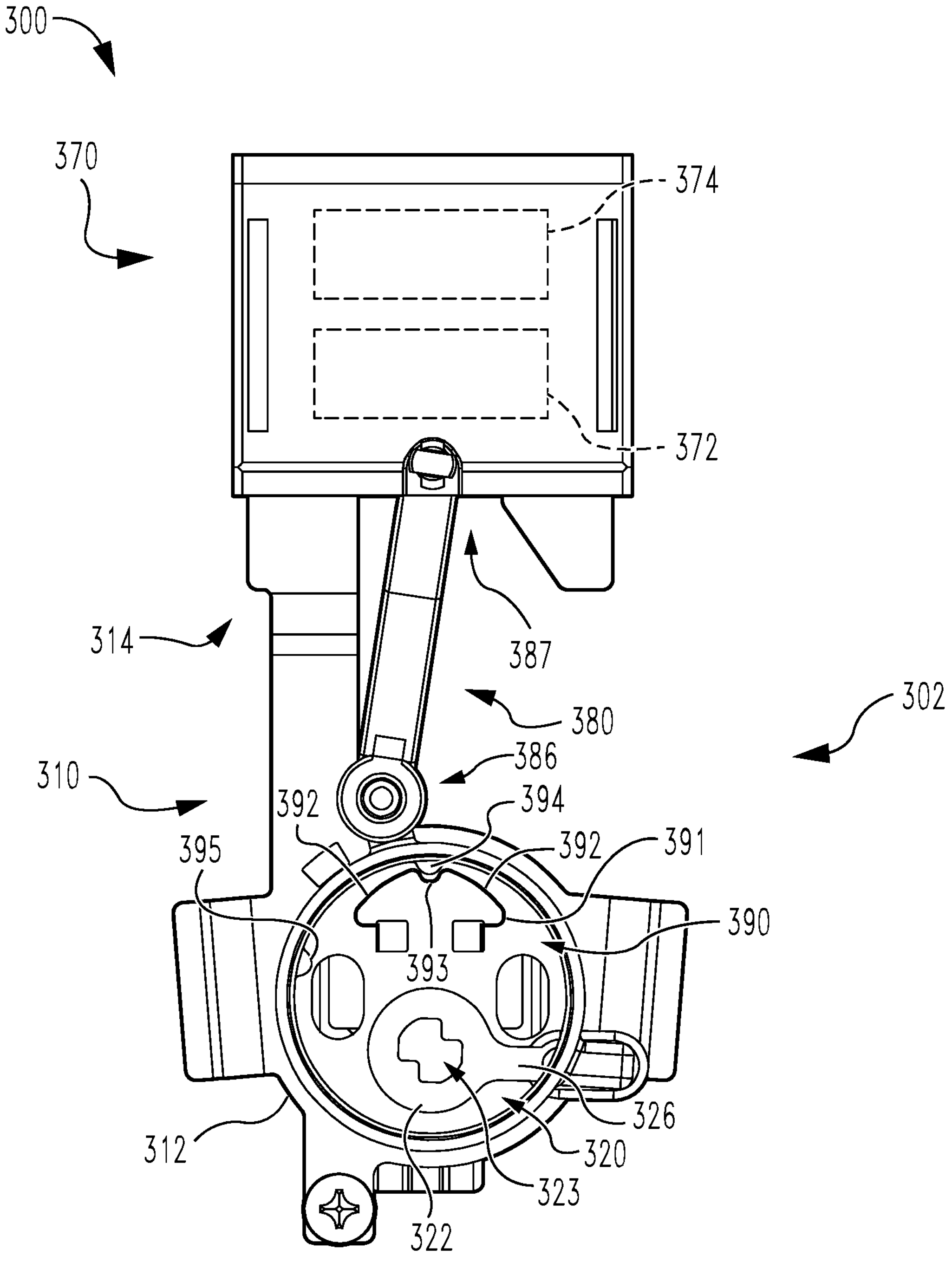
FIG. 7 is a plan view of a trim lock device according to certain embodiments.
Figure 8:
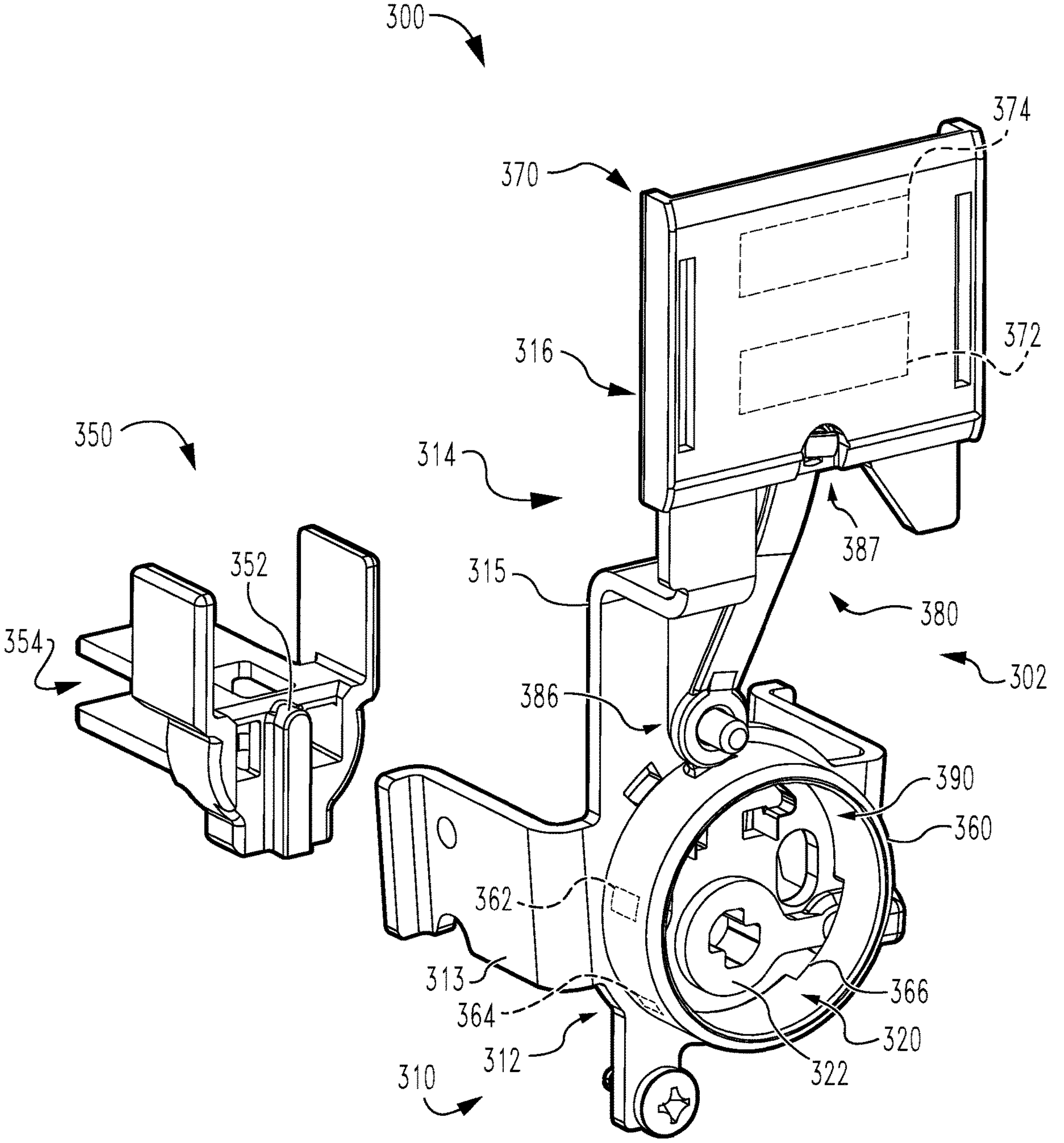
FIG. 8 is a first partially-exploded view of the trim lock device.
Figure 9:
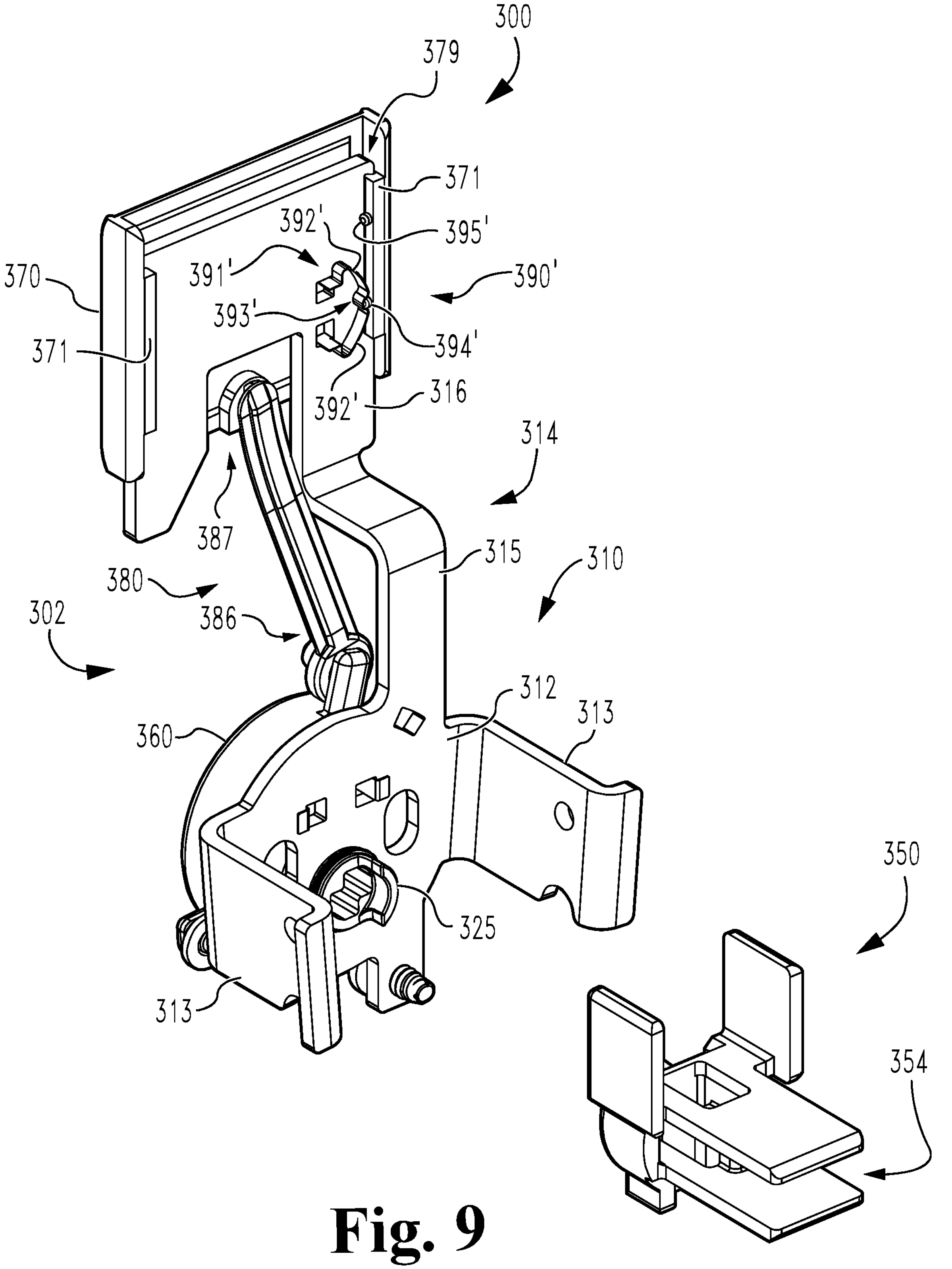
FIG. 9 is a second partially-exploded view of the trim lock device.

With additional reference to FIGS. 3-5, the pushbar assembly 200 generally includes a mounting assembly 210, a drive assembly 220 movably mounted to the mounting assembly 210, and a latch control assembly 230 operably coupled with the drive assembly 220, and in the illustrated form, further includes the latch mechanism 240 and the trim lock device 300. Moreover, in the illustrated form, the trim lock device 300 is provided as a status-indicating trim lock device that provides at least one visual indication of the locked/unlocked status of the trim lock device 300, thereby indicating whether or not the manual actuator 120 is operable to actuate the latch mechanism 240. It is also contemplated that the trim lock device 300 may not necessarily provide such a visual indication.

The mounting assembly 210 generally includes a longitudinally-extending channel member 211, which extends along a longitudinal axis 201 of the pushbar assembly 200. The mounting assembly 210 also includes a mounting plate 212 mounted in the channel member 211, a cover plate 213 enclosing a distal end portion of the channel member 211, a pair of bell crank mounting brackets 214 extending transversely from the mounting plate 212, a header plate 216 positioned adjacent a proximal end of the mounting plate 212, and a header case 217 mounted to the header plate 216, and a header bracket 219 mounted within the header case 217. In the illustrated form, the header case 217 defines a window 218 through which a status-indicating portion of an indicator plate 370 of the trim lock device 300 is visible. In certain forms, the mounting assembly 210 may include at least one additional window 218' and/or at least one further window 218" through which another status-indicating portion of the trim lock device 300 is visible. In the illustrated form, each additional window 218' and each further window 218" extends in at least one direction transverse to the primary window 218, which may provide one or more advantages as described herein.

The drive assembly 220 generally includes a transversely-movable pushbar 222, a pair of bell cranks 224 connecting the pushbar 222 with a longitudinally-movable drive rod 226, and a main spring 227 urging the drive assembly 220 toward a deactuated state. The pushbar 222 is mounted for transverse movement between a projected position and a depressed position to transition the drive assembly 220 between a deactuated state in which the pushbar 222 is in its projected position and an actuated state in which the pushbar 222 is in its depressed position. The bell cranks 224 are mounted to the bell crank mounting brackets 214, and correlate the transverse movement of the pushbar 222 with longitudinal movement of the drive rod 226. More particularly, the bell cranks 224 cause the drive rod 226 to move between a proximal position (to the left in FIG. 4) and a distal position (to the right in FIG. 4) such that the proximal position is correlated with the projected or deactuated position of the pushbar 222 and the distal position is correlated with the depressed or actuated position of the pushbar 222. Additionally, the main spring 227 is engaged between the drive rod 226 and the mounting assembly 210 such that the main spring 227 urges the drive rod 226 toward its proximal position, thereby biasing the drive assembly 220 toward its deactuated state.

The drive assembly 220 is connected with the latch control assembly 230 via a lost motion connection 202 that causes actuation of the latch control assembly 230 in response to actuation of the drive assembly 220, and which permits the drive assembly 220 to remain in its deactuated state when the latch control assembly 230 is actuated by another mechanism (e.g., the trim 100). As a result, the drive assembly 220 is operable to actuate the latch control assembly 230, and is operable to remain unactuated when the latch control assembly 230 is actuated by the trim 100. The lost motion connection 202 may include a bias member such as a spring 203 urging the latch control assembly 230 toward a deactuated state thereof.

The latch control assembly 230 generally includes a control link 232 connected with the drive rod 226 via the lost motion connection 202, a yoke 234 connected with the control link 232 for joint movement along the longitudinal axis 201, a pair of drivers 236 mounted to the header plate 216 for lateral movement, and a pair of pivot cranks 238 operably coupling the drivers 236 with the yoke 234. The control link 232 is connected with the drive assembly 220 such that actuation of the drive assembly 220 longitudinally drives the control link 232 and the yoke 234 between a proximal deactuated position and a distal actuated position. The drivers 236 are mounted for lateral movement between a laterally-outward deactuated position and a laterally-inward actuated position, and the pivot cranks 238 correlate longitudinal movement of the control link 232 and yoke 234 with lateral movement of the drivers 236.

As used herein, the terms "laterally inward" and "laterally outward" may be used to denote positions and/or motion relative to the longitudinal axis 201. For example, a laterally inward position is one nearer the longitudinal axis 201, and a laterally outward position is one farther from the longitudinal axis 201. Thus, while the laterally inward and laterally outward positions for the upper driver 236 are respectively provided as a lower position and an upper position, the laterally inward and laterally outward positions for the lower driver 236 are respectively provided as an upper position and a lower position. Similarly, laterally inward movement is movement toward the longitudinal axis 201, while laterally outward movement is movement away from the longitudinal axis 201. Thus, laterally inward movement for the upper driver 236 is downward movement, while laterally outward movement for the upper driver 236 is upward movement. Conversely, laterally inward movement for the lower driver 236 is upward movement, while laterally outward movement for the lower driver 236 is downward movement.

As noted above, the pivot cranks 238 correlate longitudinal movement of the control link 232 and the yoke 234 with lateral movement of the drivers 236. More particularly, the pivot cranks 238 correlate distal movement of the control link 232 and the yoke 234 with laterally inward or actuating movement of the drivers 236, and correlate proximal movement of the control link 232 and the yoke 234 with laterally outward or deactuating movement of the drivers 236. The latch control assembly 230 has an actuating state in which each component thereof is in a corresponding and respective actuating position, and a deactuating state in which each component thereof is in a corresponding and respective deactuating position. For the control link 232 and the yoke 234, the actuating position is a distal position, and the deactuating position is a proximal position. For the drivers 236, the actuating position is a laterally inward position, and the deactuating position is a laterally outward position.

The latch mechanism 240 is operably connected with the latch control assembly 230 such that actuating movement of the latch control assembly 230 causes a corresponding actuation of the latch mechanism 240. In the illustrated form, the latch mechanism 240 generally includes a latchbolt 242 and a retractor 244 connecting the latchbolt 242 with the yoke 234 such that distal actuating movement of the yoke 234 drives the latchbolt 242 from an extended position to a retracted position. As described herein, such actuating movement may be imparted to the latch control assembly 230 by the drive assembly 220, and may also be imparted to the latch control assembly 230 by the trim 100 when the trim lock device 300 is unlocked.

In the illustrated form, the latch mechanism 240 is installed in the header case 217, and engages a doorframe-mounted strike when the door 80 is closed and the pushbar assembly 200 is deactuated. It is also contemplated that the exit device assembly 90 may include latch mechanisms in additional or alternative locations. As one example, a latch mechanism may be provided in a mortise assembly configured for installation in a mortise cutout within the door. Additionally or alternatively, the exit device assembly 90 may be provided as a vertical exit device assembly including an upper latch mechanism and/or a lower latch mechanism. In such a vertical exit device, the upper latch mechanism may be installed above the pushbar assembly 200 (e.g., adjacent the top edge of the door 80) and connected to the upper driver 236 via an upper connector (e.g., a rod or cable). Additionally or alternatively, a lower latch mechanism may be installed below the pushbar assembly (e.g., adjacent the bottom edge of the door 80) and connected to the lower driver 236 via a lower connector (e.g., a rod or cable). In certain forms, a vertical exit device may be provided as a concealed vertical exit device, in which the connectors run through channels formed within the door 80. In other embodiments, a vertical exit device may be provided as a surface vertical exit device, in which the connectors are mounted to the egress side 82 of the door 80. An example of a vertical exit device assembly 400 is described below with reference to FIG. 18.

With additional reference to FIGS. 6-9, the trim lock device 300 is mounted within the header case 217, and generally includes a mounting bracket 310, a follower 320 rotatably mounted to the mounting bracket 310, a shroud 330 mounted to the mounting bracket 310, an input device 340 mounted within the shroud 330, and a slider 350 slidably mounted to the mounting assembly 210 and operable to engage the lower driver 236. As noted above, the illustrated trim lock device 300 is provided in the form of a status-indicating trim lock device, and includes features configured to indicate a locked/unlocked state of the trim lock device 300. More particularly, the illustrated trim lock device 300 includes an indicator assembly 302, which generally includes a transmission ring 360 rotatably mounted to the mounting bracket 310, an indicator plate 370 slidably mounted to the mounting bracket 310, and a linkage 380 connected between the transmission ring 360 and the indicator plate 370. As described herein, the indicator assembly 302 is operable to provide at least one visual indication regarding the locked/unlocked status of the trim lock device 300. In certain forms, the trim lock device 300 further includes a detent mechanism 390 operable to selectively discourage movement of the indicator assembly 302 from at least one of a lock-indicating state or an unlock-indicating state.

The mounting bracket 310 is configured for mounting to the mounting assembly 210, and provides a base to which various other components of the trim lock device 300 are mounted. In the illustrated form, the mounting bracket 310 includes a primary portion 312 configured for mounting adjacent the lower driver 236, and further includes an extension 314 that extends from the primary portion 312. The primary portion 312 includes a pair of legs 313 that facilitate mounting of the bracket 310 to the mounting assembly, and the slider 350 is mounted between the legs 313. The extension 314 includes an arm 315 and a plate portion 316, and the arm 315 is bent to accommodate the header bracket 219 such that the plate portion 316 is adjacent the front face of the header bracket 219. In certain forms, the mounting bracket 310 may be considered to define a portion of the mounting assembly 210 and/or be included in the mounting assembly 210.

The follower 320 is rotatably mounted to the mounting bracket 310, and generally includes a body portion 322 and an arm 326 extending from the body portion 322. The body portion 322 defines an opening 323 operable to receive a tailpiece 343 of the input device 340. In the illustrated form, the opening 323 is provided in the form of a bowtie opening that defines a lost rotational motion connection with the tailpiece 343 when the tailpiece 343 is received in the opening 323. It is also contemplated that the opening 323 may take another form, such as one configured for rotational coupling with the tailpiece 343. Formed on the rear side of the body portion 322 is a lug 325 operable to selectively engage the slider 350. As described herein, the lug 325 prevents laterally-inward movement of the slider 350 when the follower 320 is in a locked position, and does not prevent laterally-inward movement of the slider 350 when the follower 320 is in an unlocked position. The arm 326 extends from the body portion 322 into a recess 366 formed in the transmission ring 360 such that the follower 320 is capable of rotating the transmission ring 360.

The shroud 330 is mounted to the mounting bracket 310 and defines a chamber 334 in which the input device 340 is seated. In certain forms, the shroud 330 may include a shroud window 336 that defines an additional window 218' of the mounting assembly 210. In certain forms, the shroud 330 may be considered to define a portion of the mounting assembly 210 and/or be included in the mounting assembly 210.

The input device 340 is mounted in the chamber 334 of the shroud 330, and is at least selectively capable of rotating the follower 320 between its locked position and its unlocked position. As noted above, the input device 340 includes a tailpiece 343 that extends into the opening 323 of the follower 320 such that the follower 320 is operable to rotate in response to rotation of the tailpiece 343. In the illustrated form, the input device 340 is provided in the form of a lock cylinder 340'. As is typical of lock cylinders, the lock cylinder 340' generally includes a shell 341, a plug 342 rotatably mounted in the shell 341, and a tumbler assembly operable to selectively prevent rotation of the plug 342 relative to the shell 341. More particularly, the tumbler assembly permits rotation of the plug 342 relative to the shell 341 when an authorized key 349 is inserted into the plug 342, and prevents rotation of the plug 342 relative to the shell 341 when the authorized key 349 is not inserted. The tailpiece 343 is coupled with the plug 342 such that, upon insertion of the authorized key 349, rotation of the key 349 is transmitted to the follower 320 to drive the follower 320 between its locked position and its unlocked position.

While the illustrated input device 340 is provided in the form of a lock cylinder 340', it should be appreciated that other forms of input device are contemplated. For example, the input device 340 may instead be provided in the form of a thumbturn such that users within the interior region 84 are capable of driving the follower 320 between its locked position and its unlocked position without requiring use of an authorized key 349. In other embodiments, the input device 340 may be operable by a hex key. Moreover, while the illustrated input device 340 is purely mechanical, it is also contemplated that the input device 340 may include electronic and/or electromechanical components. For example, the input device 340 may comprise a motor and a button that, when depressed, causes the motor to rotate the follower 320 between its locked position and its unlocked position.

The slider 350 is mounted to the mounting assembly 210 between the mounting bracket legs 313 and adjacent the lower driver 236. As described herein, the slider 350 is engaged with the driver 236 via a one-way pushing engagement such that the slider 350 is capable of pushing the driver 236 laterally inward when the slider 350 is driven to an actuated position, and of remaining in a deactuated position during actuation of the driver 236 by another component (e.g., the drive assembly 220). A front side of the slider 350 includes a ridge 352 operable to engage the lug 325 of the follower 320 such that the follower 320 is operable to retain the slider 350 in its deactuated position when the follower 320 is in its locked position. A rear side of the slider 350 includes a cavity 354 operable to receive the lift finger 144 such that the lift finger assembly 140 is operable to drive the slider 350 to its actuated position when the follower 320 is in its unlocked position. As described herein, such actuation of the slider 350 urges the driver 236 laterally inward, thereby actuating the latch control assembly 230 and the latch mechanism 240.

The transmission ring 360 is rotatably mounted to the mounting bracket 310 and is engaged with the follower 320 such that the follower 320 is operable to rotate the transmission ring 360 to thereby move the indicator assembly 302 between a first state and a second state. In the illustrated form, the transmission ring 360 and the follower 320 are mounted for rotation about transverse axes that are laterally offset from one another, and the transmission ring 360 includes a recess 366 through which the arm 326 of the follower 320 projects such that rotation of the follower 320 about its rotational axis causes a corresponding rotation of the transmission ring 360 about its rotational axis. It is also contemplated that the follower 320 and the transmission ring 360 may be mounted for rotation about a single common axis. In such forms, the follower 320 and the transmission ring 360 may be integrally formed with one another or otherwise coupled for joint rotation about the common axis.

In certain forms, the transmission ring 360 may be operable to provide a visual indication regarding the locked/unlocked status of the trim lock device 300. For example, the transmission ring 360 may include a first indicium 362 that is aligned with the shroud window 336 when the trim lock device 300 is in its first state and/or a second indicium 364 that is aligned with the shroud window 336 when the trim lock device 300 is in its second state. The first transmission ring indicium 362 corresponds to the first state, and may include one or more of a color, a symbol, and/or a word. The second transmission ring indicium 364 corresponds to the second state, and may include one or more of a color, a symbol, and/or a word. Further details regarding the transmission ring indicia 362, 364 and the selective alignment with the shroud window 336 are provided below.

The indicator plate 370 is slidably mounted to the plate portion 316 of the mounting bracket 310 for lateral movement between a first position and a second position. More particularly, the indicator plate 370 adopts the first position when the indicator assembly 302 is in its first state, and adopts the second position when the indicator assembly 302 is in its second state. The indicator plate 370 may, for example, include one or more ridges 371 that define one or more grooves 379 in which the edges of the plate portion 316 are received to restrict the indicator plate 370 to lateral movement. The indicator plate 370 includes a first indicium 372 and/or a second indicium 374, each of which is selectively aligned with the primary window 218. The first indicium 372 corresponds to the first state, and may include one or more of a color, a symbol, and/or a word. The second indicium 374 corresponds to the second state, and may include one or more of a color, a symbol, and/or a word.

The indicator plate 370 is mounted such that the first indicium 372 is located within a reference area when the trim lock device 300 is in the first state and is not located within the reference area when the trim lock device 300 is in the second state. Moreover, the second indicium 374 is positioned such that the second indicium 374 is located within the reference area when the trim lock device 300 is in the second state and is not located within the reference area when the trim lock device 300 is in the first state. When installed to the pushbar assembly 200, the reference area corresponds to and/or is defined by the primary window 218 such that the first indicium 372 is aligned with the window 218 when the trim lock device 300 is in its first state and the second indicium is aligned with the window 218 when the trim lock device 300 is in its second state. As such, the indicator plate 370 provides, via the window 218, a visual indication regarding the state of the trim lock device 300.

The linkage 380 is operably connected between the transmission ring 360 and the indicator plate 370, and causes the indicator plate 370 to move laterally in response to rotation of the transmission ring 360. The linkage 380 includes a first end portion 386 and an opposite second end portion 387. The first end portion 386 is pivotably coupled with the transmission ring 360, and the second end portion 387 is pivotably coupled with the indicator plate 370. In the illustrated form, the linkage 380 is provided as a single rigid bar. It is also contemplated that the linkage 380 may be provided in another form, such as a form including plural bars pivotably coupled to one another.

The detent mechanism 390 is operable to resist movement of the indicator assembly 302 from at least one of the first state or the second state, and in the illustrated form is configured to resist movement of the indicator assembly 302 from each of the first state and the second state. The illustrated detent mechanism 390 generally includes a bias member in the form of a leaf spring 391 that is bent to form a pair of ramps 392 and a first engagement feature 393, and further includes one or more second engagement features 394, 395 operable to selectively engage the first engagement feature 393. In the illustrated embodiment, the leaf spring 391 is mounted to the mounting bracket 310, and the second engagement features 394, 395 are formed on or in the transmission ring 360. It is also contemplated that this arrangement may be reversed. As described herein, the illustrated detent mechanism 390 selectively resists movement of the transmission ring 360 from each of a transmission ring first position and a transmission ring second position to selectively resist movement of the indicator assembly 302 from each of the first state and the second state.

In the illustrated form, the first engagement feature 393 is provided in the form of a recess defined by the leaf spring 391, and each of the second engagement features 394, 395 is provided in the form of a protrusion operable to engage the first engagement feature 393. It is also contemplated that other combinations of engagement features may be utilized. As one example, the first engagement feature 393 may be provided as a protrusion, and the second engagement features 394, 395 may be provided as recesses operable to receive the protrusion. Moreover, while the illustrated bias member is provided in the form of a leaf spring 391, it is also contemplated that other forms of bias members may be utilized to urge the first engagement feature 393 into engagement with the second engagement features 394, 395. For example, the bias member may instead comprise one or more of a torsion spring, a compression spring, an extension spring, an elastic member, and/or a magnetic component.

In addition or as an alternative to the transmission ring detent mechanism 390, the trim lock assembly 300 may include an indicator plate detent mechanism 390'. The detent mechanism 390' is operable to resist movement of the indicator assembly 302 from at least one of the first state or the second state, and in the illustrated form is configured to resist movement of the indicator assembly 302 from each of the first state and the second state. The illustrated detent mechanism 390' generally includes a bias member in the form of a leaf spring 391' that is bent to form a pair of ramps 392' and a first engagement feature 393', and further includes one or more second engagement features 394', 395' operable to selectively engage the first engagement feature 393'. In the illustrated form. the leaf spring 391' is mounted to the mounting bracket 310', and the second engagement features 394', 395' are formed on or in the indicator plate 370. It is also contemplated that this arrangement may be reversed. As described herein, the illustrated detent mechanism 390' selectively resists movement of the indicator plate 370 from each of an indicator plate first position and an indicator plate second position to selectively resist movement of the indicator assembly 302 from each of the first state and the second state.

In the illustrated form, the first engagement feature 393' is provided in the form of a recess defined by the leaf spring 391', and each of the second engagement features 394', 395' is provided in the form of a protrusion operable to engage the first engagement feature 393'. It is also contemplated that other combinations of engagement features may be utilized. As one example, the first engagement feature 393' may be provided as a protrusion, and the second engagement features 394', 395' may be provided as recesses operable to receive the protrusion. Moreover, while the illustrated bias member is provided in the form of a leaf spring 391', it is also contemplated that other forms of bias members may be utilized to urge the first engagement feature 393' into engagement with the second engagement features 394', 395'. For example, the bias member may instead comprise one or more of a torsion spring, a compression spring, an extension spring, an elastic member, and/or a magnetic component.

Figure 11:
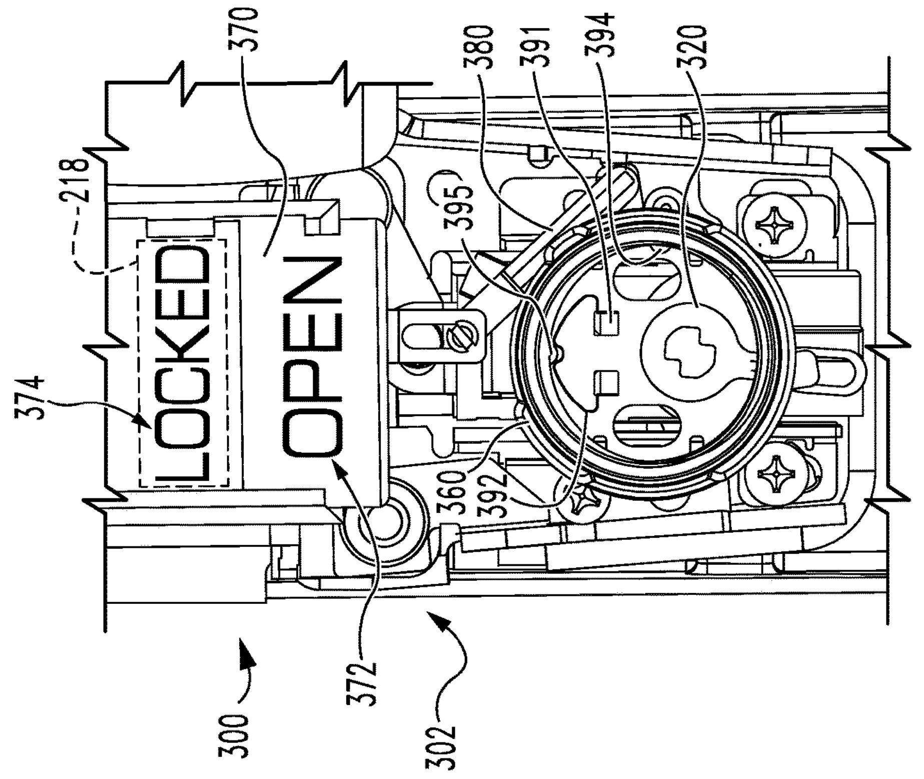
FIG. 11 illustrates a portion of the pushbar assembly in a locked state.
Figure 13:
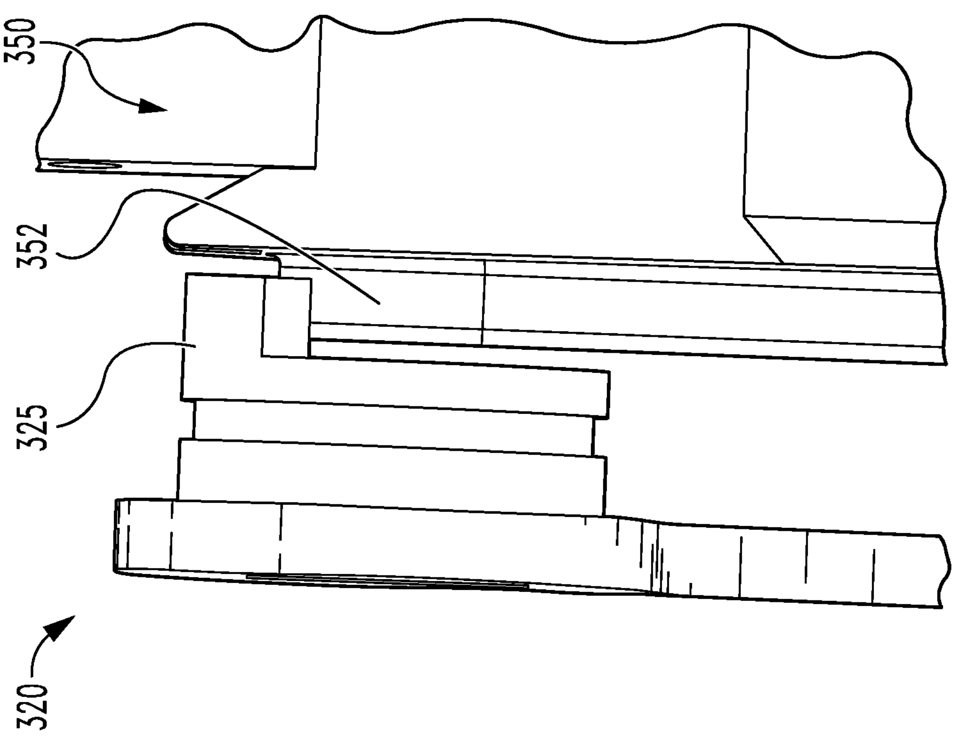
FIG. 13 is a perspective view of a portion of the trim lock device in the locked state.
Figure 12:
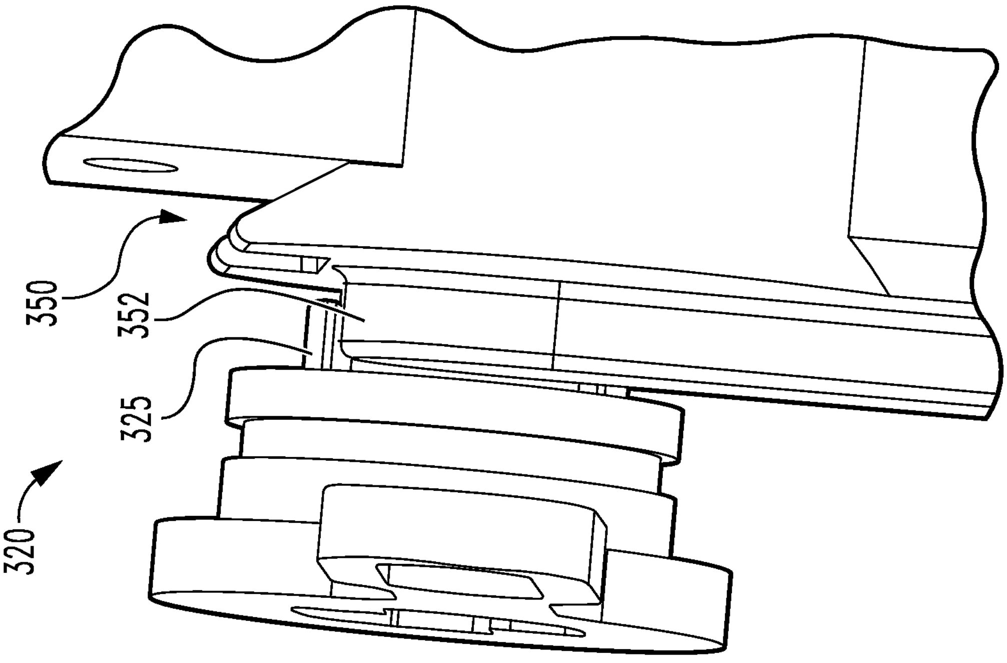
FIG. 12 is a perspective view of a portion of the trim lock device in the unlocked state.

With additional reference to FIGS. 10-13, the trim lock device 300 is operable in a first state and a second state. One of the first state or the second state is an unlocked state, and the other of the first state or the second state is a locked state. In the illustrated form, the first state is the unlocked state (FIGS. 10 and 12), and the second state is the locked state (FIGS. 11 and 13). It is also contemplated that the first state may be the locked state, and the second state may be the unlocked state.

When the trim lock device 300 is in the unlocked state (FIGS. 10 and 12), the lug 325 of the follower 320 is misaligned with the ridge 352 of the slider 350 such that the follower 320 is inoperable to block laterally inward (e.g., upward) movement of the slider 350. As a result, actuation of the manual actuator 120 drives the lift finger assembly 140 and the slider 350 laterally inward (e.g., upward) to thereby move the lower driver 236 to its actuated position. As described above, such movement of the lower driver 236 moves the latch control assembly 230 to its actuated state, thereby actuating the latch mechanism 240. Thus, when the trim lock device 300 is in the unlocked state, the manual actuator 120 on the non-egress side 81 of the door 80 is operable to actuate the latch mechanism 240.

When the trim lock device 300 is in the locked state (FIGS. 11 and 13), the lug 325 of the follower 320 is aligned with the ridge 352 of the slider 350 such that the follower 320 is operable to block laterally inward (e.g., upward) movement of the slider 350. As a result, although actuation of the manual actuator 120 urges the lift finger assembly 140 and the slider 350 laterally inward (e.g., upward), movement of the slider 350 is blocked by the follower 320, thereby preventing the lift finger assembly 140 from moving the driver 236 to its actuated position. Thus, when the trim lock device 300 is in the locked state, the manual actuator 120 on the non-egress side 81 of the door 80 is inoperable to actuate the latch mechanism 240.

While not necessarily included in certain embodiments, the illustrated trim lock device 300 includes an indicator assembly 302 operable to provide at least one visual indication of the locked/unlocked status of the trim lock device 300. More particularly, the illustrated indicator assembly 302 comprises an indicator plate 370 that includes a first indicium 372 corresponding to the first state of the trim lock device 300, and which may further include a second indicium 374 corresponding to the second state of the trim lock device 300. In the illustrated form, the indicator plate 370 includes both a first indicium 372 and a second indicium 374 different from the first indicium 372. As noted above, in the illustrated embodiment, the first state is the unlocked state and the second state is the locked state. Thus, the first indicium 372 corresponds to the unlocked state, and the second indicium 374 corresponds to the locked state. The first indicium 372 may, for example, include one or more of a color (e.g., white), a word (e.g., "OPEN" or "UNLOCKED"), and/or an icon (e.g., a padlock with an open shackle). The second indicium 374 may likewise include one or more of a color (e.g., red), a word (e.g., "LOCKED"), and/or an icon (e.g., a padlock with a closed shackle).

As noted above, each of the first indicium 372 and the second indicium 374 is selectively positioned within a reference area based upon the state of the trim lock device 300. In the illustrated form, the first indicium 372 is aligned with the window 218 when the trim lock device 300 is in the first state, thereby providing to users a visual indication that the trim lock device 300 is in the first state. Similarly, the second indicium 374 is aligned with the window 218 when the trim lock device 300 is in the second state, thereby providing to users a visual indication that the trim lock device 300 is in the second state.

Figure 10:
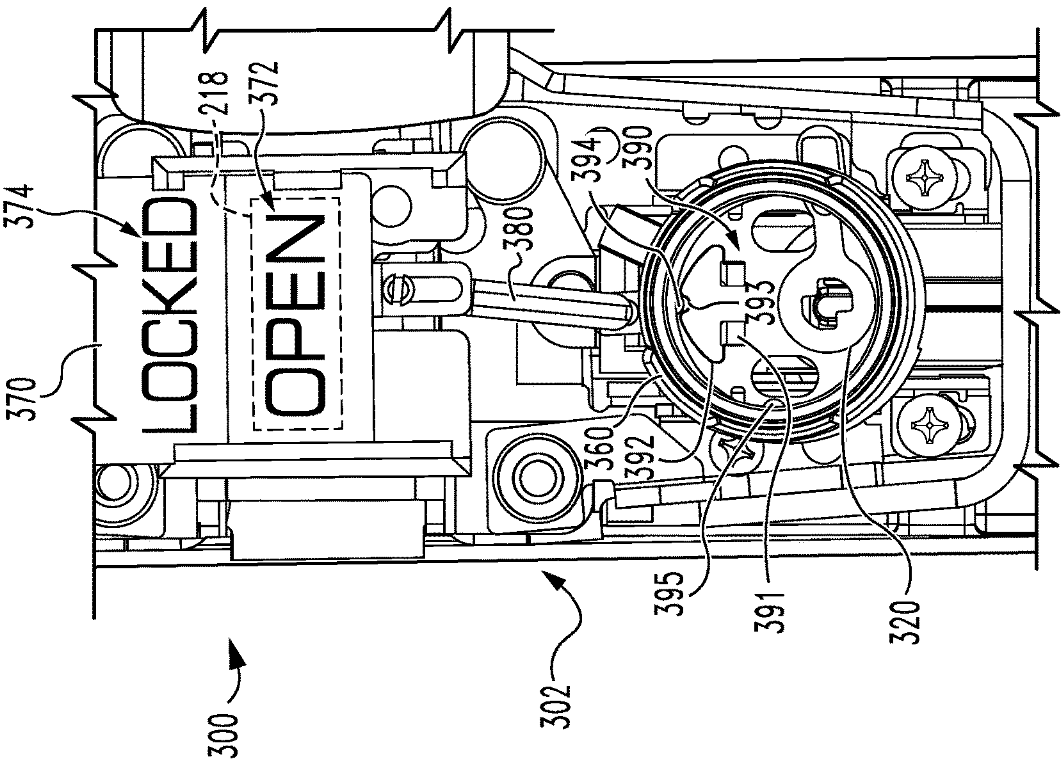
FIG. 10 illustrates a portion of the pushbar assembly in an unlocked state.

As will be appreciated, the trim lock device 300 can be transitioned between its first state and its second state by operation of the input device 340. For example, rotation of the input device tailpiece 343 in a first rotational direction (clockwise in FIGS. 10 and 11) drives the follower 320 from its unlocking position to its locking position, thereby aligning the lug 325 with the ridge 352. Such rotation of the follower 320 also rotates the transmission ring 360 in the first rotational direction, thereby causing the linkage 380 to pull the indicator plate 370 to its second position, in which the second indicium 374 is visible via the window 218 (FIG. 11). Conversely, rotation of the input device tailpiece 343 in a second rotational direction (counter-clockwise in FIGS. 10 and 11) drives the follower 320 from its locking position to its unlocking position, thereby moving the lug 325 out of alignment with the ridge 352. Such rotation of the follower 320 also rotates the transmission ring 360 in the second rotational direction, thereby causing the linkage 380 to push the indicator plate 370 to its first position, in which the first indicium 372 is visible via the window 218 (FIG. 10).

In embodiments that include the detent mechanism 390, the detent mechanism 390 selectively resists movement of the indicator assembly 302 from at least one of the first state or the second state. In the illustrated form, the detent mechanism 390 selectively resists movement of the indicator assembly 302 from each of the first state and the second state. More particularly, when the trim lock device 300 is in the first state (FIG. 10), the first protrusion 394 is engaged with the recess 393 of the leaf spring 391 such that the biasing force of the leaf spring 391 resists disengagement of the engaged engagement features 393, 394.

When the transmission ring 360 is in its first position (FIG. 10) and a sufficient torque is exerted on the transmission ring 360 in the first rotational direction, the engagement features 393, 394 cause the bias member 391 to deform in a manner that permits the first protrusion 394 to move out of the recess 393. As the transmission ring 360 approaches its second position (FIG. 11), the second protrusion 395 travels along one of the ramps 392, thereby elastically deforming the bias member 391. When the transmission ring 360 reaches its second position, the second protrusion 395 engages the recess 393 and the bias member 391 returns to its natural state.

When the transmission ring 360 is in its second position (FIG. 11) and a sufficient torque is exerted on the transmission ring 360 in the second rotational direction, the engagement features 393, 395 cause the bias member 391 to deform in a manner that permits the second protrusion 395 to move out of the recess 393. As the transmission ring 360 approaches its first position (FIG. 10), the first protrusion 394 travels along one of the ramps 392, thereby elastically deforming the bias member 391. When the transmission ring 360 reaches its first position, the first protrusion 394 engages the recess 393 and the bias member 391 returns to its natural state.

As should be evident from the foregoing, the illustrated detent mechanism 390 selectively resists movement of the indicator assembly 302 from each of its first state and its second state. More particularly, the detent mechanism 390 exerts a resistive force resisting movement of the indicator assembly 302 when a protrusion 394/395 of the detent mechanism 390 is engaged with a recess 393 of the detent mechanism 390, and the resistive force is reduced or eliminated when the first engagement feature 393 is disengaged from each of the second engagement features 394, 395. By selectively resisting movement of the indicator assembly 302 from at least one of its first state or its second state, the detent mechanism 390 may aid in retaining the indicator plate 370 in the correct position. Additionally or alternatively, the detent mechanism 390 may provide tactile feedback to the user to indicate that the trim lock device 300 has reached the selected one of the first state or the second state.

While the illustrated detent mechanism 390 selectively resists movement of the trim lock device 300 and the indicator assembly 302 from the first and second states thereof by selectively resisting rotation of the transmission ring 360, it is also contemplated that a detent mechanism according to other embodiments may selectively resist movement of another component of the trim lock device 300. For example, a detent mechanism 390' may be associated with the indicator plate 370 to selectively resist movement of the indicator plate 370 from the first and/or second positions thereof. Those skilled in the art will readily appreciate that the detent mechanism 390' will selectively resist movement of the indicator plate 370 in a manner analogous to that described above with reference to the detent mechanism 390 selectively resisting movement of the transmission ring 360.

Moreover, while the detent mechanism 390 is illustrated and described as being installed to an exit device assembly 90, it should be appreciated that the teachings provided herein with reference to the detent mechanism 390 may be applied to other access control devices, such as mortise locksets, cylindrical locksets, tubular locksets, locking handlesets, and other formats of access control device.

Figure 15:
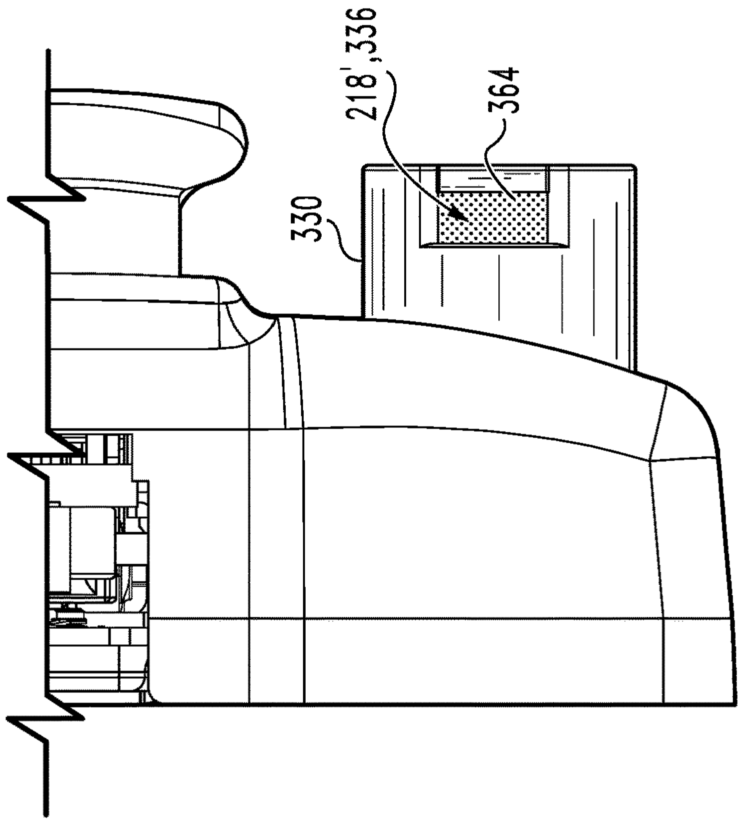
FIG. 15 is a side view of a portion of the pushbar assembly in the locked state.
Figure 14:
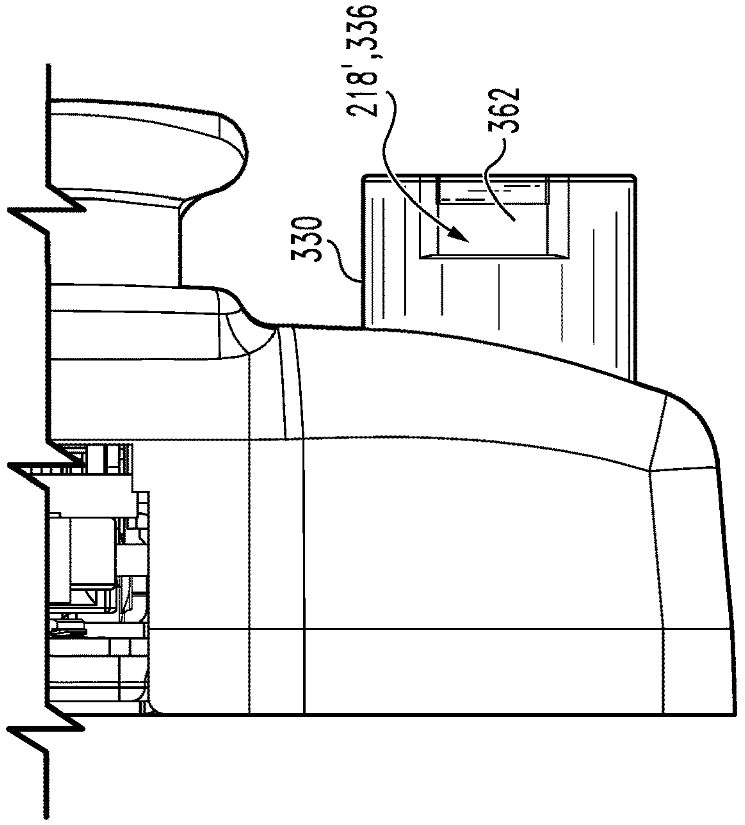
FIG. 14 is a side view of a portion of the pushbar assembly in the unlocked state.

With additional reference to FIGS. 14 and 15, in certain embodiments, the indicator assembly 302 further includes an additional set of locked/unlocked indicia that are selectively visible via an additional window 218' that extends transverse to the first window 218. For example, the illustrated transmission ring 360 includes first and second transmission ring indicia 362, 364 that selectively align with the shroud window 218', 336. More particularly, the first transmission ring indicium 362 aligns with the shroud window 218', 336 when the trim lock device 300 is in the first state (FIG. 14), thereby providing to users a visual indication that the trim lock device 300 is in the first state. Similarly, the second transmission ring indicium 364 aligns with the shroud window 218', 336 when the trim lock device 300 is in the second state (FIG. 15), thereby providing to users a visual indication that the trim lock device 300 is in the second state. As noted above, the shroud window 218', 336 extends transverse to the window 218, and the transmission ring indicia 362, 364 extend transverse to the indicator plate indicia 372, 374. As such, the additional indicia 362, 364 facilitate inspection of the locked/unlocked status of the trim lock device 300 from viewing angles from which the indicator plate indicia 372, 374 may not necessarily be visible.

Figure 17:
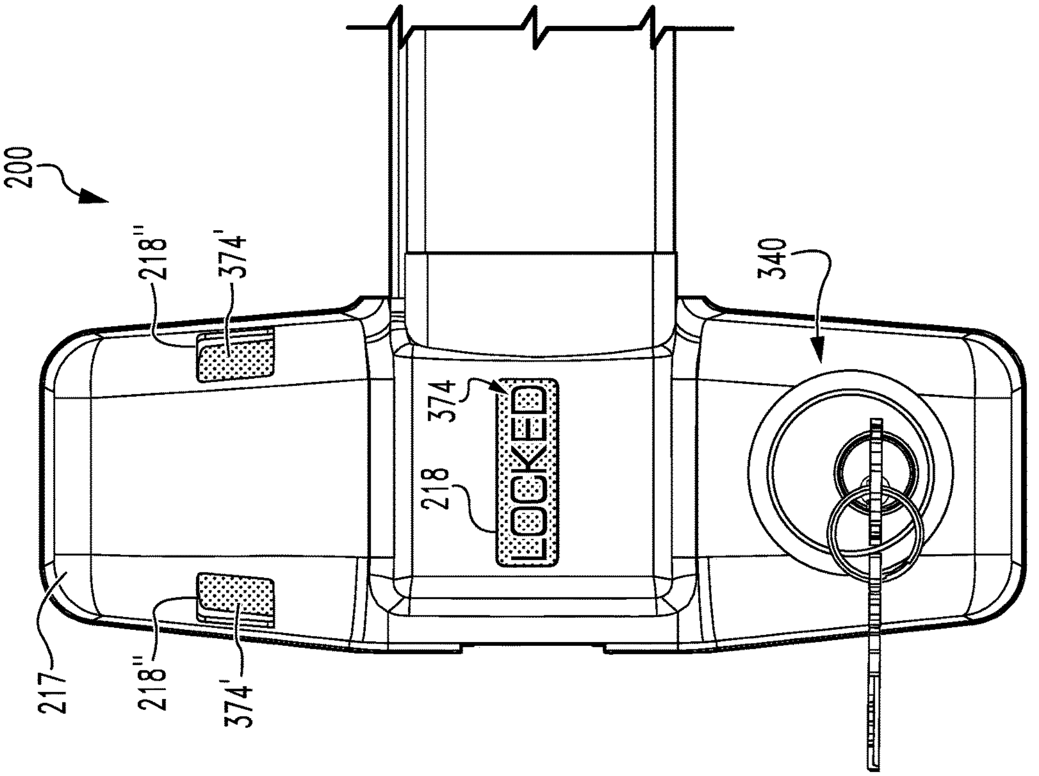
FIG. 17 is a front view of a portion of the pushbar assembly in the locked state.
Figure 16:
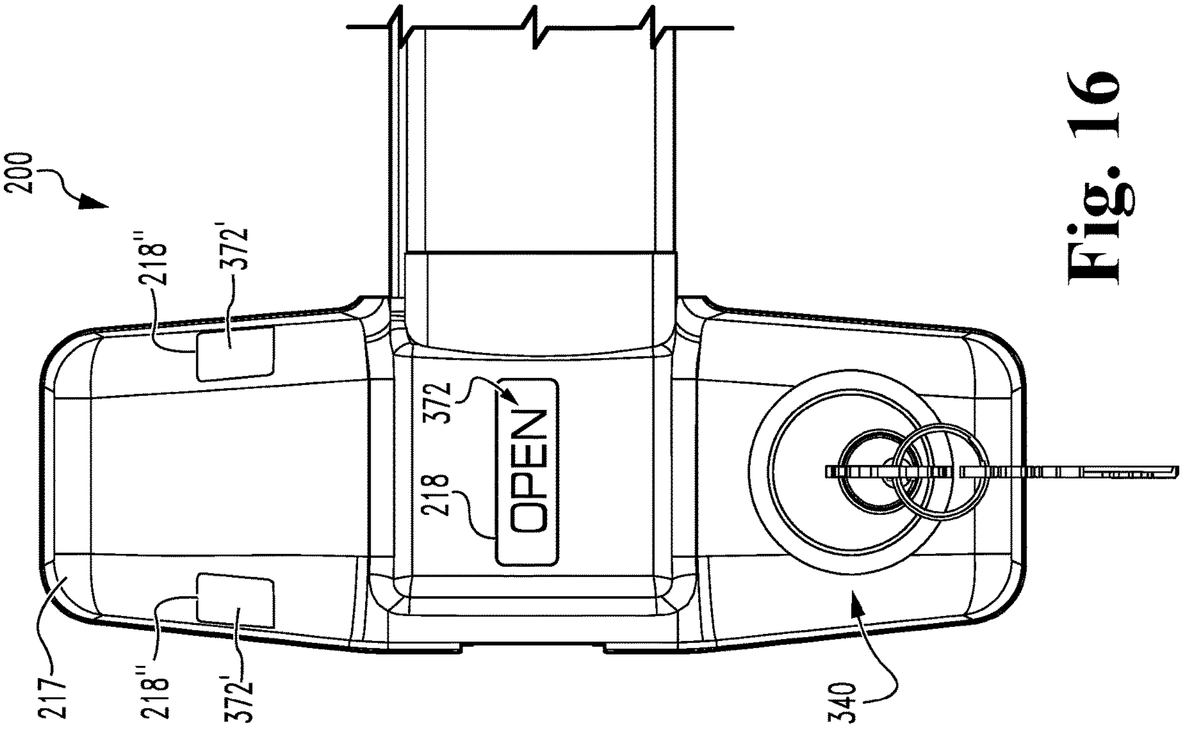
FIG. 16 is a front view of a portion of the pushbar assembly in the unlocked state.

With additional reference to FIGS. 16 and 17, in addition or as an alternative to the transmission ring indicia 362, 364, the indicator assembly 302 may include a further set of locked/unlocked indicia that are selectively visible via a further window 218" that extends transverse to the first window 218. For example, the indicator plate 370 may include one or more extensions including further indicia 372', 374' that selectively align with the further window 218". In such forms, a first further indicium 372' aligns with the further window 218" when the trim lock device 300 is in the first state (FIG. 16), thereby providing to users a visual indication that the trim lock device 300 is in the first state. Similarly, the second further indicium 374' aligns with the further window 218" when the trim lock device 300 is in the second state (FIG. 17), thereby providing to users a visual indication that the trim lock device 300 is in the second state. As with the shroud window 218' and the transmission ring indicia 362, 364, the further window 218" extends transverse to the window 218, and the further indicia 372', 374' extend transverse to the primary indicator plate indicia 372, 374. As such, the further indicia 372', 374' facilitate inspection of the locked/unlocked status of the trim lock device 300 from viewing angles from which the primary indicator plate indicia 372, 374 may not necessarily be visible.

Figure 18:
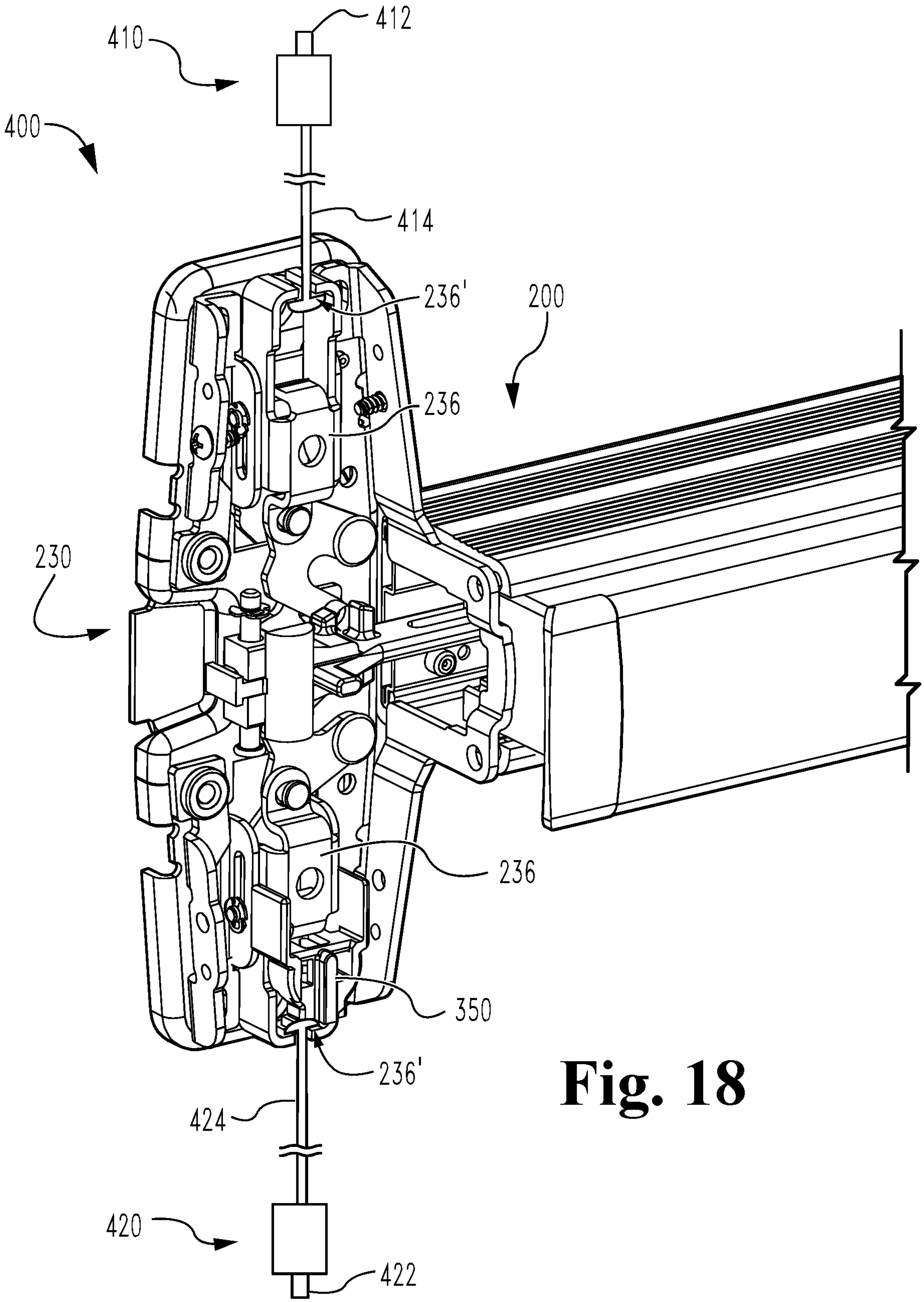
FIG. 18 is a perspective view of a portion of a vertical exit device assembly according to certain embodiments

With additional reference to FIG. 18, illustrated therein is a portion of an exit device assembly 400 according to certain embodiments. The exit device assembly 400 generally includes the trim 100, the pushbar assembly 200, and the trim lock device 300, of which the trim 100, portions of the pushbar assembly 200, and the majority of the trim lock device 300 are omitted for clarity. The exit device assembly 400 further includes one or more remote latch mechanisms, each of which is connected to the latch control assembly 230 and includes a latch. In certain embodiments, the exit device assembly 400 may include an upper latch mechanism 410 that includes an upper latch 412, is positioned above the pushbar assembly 200 (e.g., adjacent the top edge of the door 80), and is connected to the upper driver 236 via an upper connector 414, the lower end of which is coupled with an attachment point 236' of the upper driver 236. In addition or as an alternative to the upper latch mechanism 410, the exit device assembly 400 may include a lower latch mechanism 420 that includes a lower latch 422, is positioned below the pushbar assembly 200 (e.g., adjacent the bottom edge of the door 80), and is connected to the lower driver 236 via a lower connector 424, the upper end of which is coupled with an attachment point 236' of the lower driver 236.

In certain embodiments, the exit device assembly 400 may be provided as a concealed vertical exit device assembly, in which the connector(s) 414, 424 extend through channels formed in the door 80. In other embodiments, the exit device assembly 400 may be provided as a surface vertical exit device assembly, in which the connector(s) 414, 424 extend along the egress side 82 of the door. In certain embodiments, the connector(s) 414, 424 may be provided in the form of flexible cables, while in other embodiments, the connector(s) 414, 424 may be provided in the form of rigid rods.

With each of the remote latch mechanisms 410, 420 connected to a corresponding one of the drivers 236, actuation of the latch control assembly 230 causes a corresponding actuation of the remote latch mechanism(s) 410, 420. Thus, in selectively preventing the actuation of the latch control assembly 230 by the manual actuator 120, the trim lock device 300 is operable to selectively prevent the manual actuator 120 from operating the remote latch mechanism(s) 410, 420 in a manner analogous to that described above.

Unlike certain prior trim lock mechanisms, the illustrated trim lock device 300 may not necessarily prevent the connection of remote latch mechanisms (e.g., the latch mechanisms 410, 420) with the drivers 236. More particularly, the slider 350 is sized and shaped such that the slider 350 does not interfere with the attachment points 236' of the drivers 236, thereby enabling each driver 236 to be coupled with a corresponding connector 414, 424. Thus, while certain prior approaches were limited to providing trim locking functionality in connection with rim-format exit device assemblies (i.e., those in which the latch mechanism 240 is mounted in the header case 217), the trim lock device 300 described herein is capable of use in other formats of exit device assembly, including vertical exit device assemblies, mortise-format exit device assemblies, and three-point exit device assemblies.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An indicator assembly, comprising:

a mounting bracket;

a follower rotatably mounted to the mounting bracket, the follower configured to receive a tailpiece of an input device such that the input device is at least selectively operable to rotate the follower;

a transmission ring rotatably mounted to the mounting bracket, wherein the transmission ring is engaged with the follower such that the follower is operable to rotate the transmission ring between a first transmission ring position and a second transmission ring position; and an indicator plate slidably mounted to the mounting bracket for movement between a first indicator plate position and a second indicator plate position to selectively place a first indicium of the indicator plate within a reference area;

wherein the transmission ring is operably connected with the indicator plate such that movement of the transmission ring between the first transmission ring position and the second transmission ring position drives the indicator plate between the first indicator plate position and the second indicator plate position; and wherein the follower is rotatable about a rotational axis that passes through the transmission ring.

2. The indicator assembly of claim 1, further comprising a detent mechanism mounted to the mounting bracket and configured to resist rotation of the transmission ring from one of the first transmission ring position or the second transmission ring position.

3. The indicator assembly of claim 2, wherein the detent mechanism is further configured to resist rotation of the transmission ring from the other of the first transmission ring position or the second transmission ring position.

4. The indicator assembly of claim 2, wherein the detent mechanism comprises one of a recess or a protrusion;

wherein the transmission ring comprises the other of a recess or a protrusion; and wherein the protrusion is engaged with the recess when the transmission ring is in the one of the first transmission ring position or the second transmission ring position.

5. The indicator assembly of claim 2, wherein the detent mechanism comprises a leaf spring.

6. The indicator assembly of claim 2, wherein the transmission ring further has a third transmission ring position intermediate the first transmission ring position and the second transmission ring position; and wherein the detent mechanism does not resist rotation of the transmission ring from the third transmission ring position.

7. The indicator assembly of claim 1, further comprising a linkage comprising a first end portion and an opposite second end portion;

wherein the first end portion is pivotably engaged with the transmission ring; and wherein the second end portion is pivotably engaged with the indicator plate.

8. The indicator assembly of claim 1, wherein the indicator plate further comprises a second indicium;

wherein the first indicium is located within the reference area when the indicator plate is in the first indicator plate position and is outside the reference area when the indicator plate is in the second indicator plate position; and wherein the second indicium is located within the reference area when the indicator plate is in the second indicator plate position and is outside the reference area when the indicator plate is in the first indicator plate position.

9. The indicator assembly of claim 1, further comprising a detent mechanism mounted to the mounting bracket and configured to resist movement of the indicator plate from one of the first indicator plate position or the second indicator plate position.

10. The indicator assembly of claim 1, further comprising a mounting assembly comprising the mounting bracket and a shroud, wherein the transmission ring is positioned within the shroud;

wherein the mounting assembly comprises a first engagement feature; and wherein the transmission ring comprises a second engagement feature configured to engage the first engagement feature when the transmission ring is in one of the first transmission ring position or the second transmission ring position to thereby resist rotation of the transmission ring from the one of the first transmission ring position or the second transmission ring position.

11. The indicator assembly of claim 10, further comprising a detent mechanism, wherein the detent mechanism comprises one of the first engagement feature or the second engagement feature.

12. The indicator assembly of claim 11, wherein the detent mechanism comprises the first engagement feature.

13. The indicator assembly of claim 10, wherein the first engagement feature comprises one of a recess or a protrusion; and wherein the second engagement feature comprises the other of a recess or a protrusion.

14. An apparatus for an access control device having a first condition and a second condition, the apparatus comprising:

a mounting bracket;

a leaf spring defining a primary engagement feature;

an indicator assembly movably mounted to the mounting bracket, the indicator assembly comprising a first indicium, a second indicium, a first secondary engagement feature, and a second secondary engagement feature; and an input device operable to transition the access control device between the first condition and the second condition to thereby transition the indicator assembly between a first state corresponding to the first condition and a second state corresponding to the second condition;

wherein the primary engagement feature is operable to selectively abut each of the first secondary engagement feature and the second secondary engagement feature in response to movement of the indicator assembly between the first state and the second state;

wherein, with the indicator assembly in the first state, the first indicium is aligned with a reference area, and the primary engagement feature abuts the first secondary engagement feature to thereby resist movement of the indicator assembly from the first state; and wherein, with the indicator assembly in the second state, the second indicium is aligned with the reference area, and the primary engagement feature abuts the second secondary engagement feature to thereby resist movement of the indicator assembly from the second state.

15. The apparatus of claim 14, wherein the indicator assembly comprises a ring rotatably mounted to the mounting bracket.

16. The apparatus of claim 15, wherein the ring comprises the first indicium and the second indicium.

17. The apparatus of claim 15, wherein the indicator assembly further comprises an indicator plate operable to be moved by the ring; and wherein the indicator plate comprises the first indicium and the second indicium.

18. The apparatus of claim 15, wherein the input device is at least partially received in the ring.

19. The apparatus of claim 15, further comprising a follower operable to rotate the ring; and wherein the follower is mounted for rotation about a rotational axis that extends through the ring.

20. The apparatus of claim 15, wherein, with the indicator assembly in the first state, the primary engagement feature is disengaged from the second secondary engagement feature.

21. The apparatus of claim 20, wherein, with the indicator assembly in the second state, the primary engagement feature is disengaged from the first secondary engagement feature.

22. An apparatus for an access control device having a first condition and a second condition, the apparatus comprising:

a mounting bracket;

an indicator assembly movably mounted to the mounting bracket, the indicator assembly having a plurality of states, the plurality of states comprising:

a first state in which a first indicium is aligned with a reference area; and a second state in which a second indicium is aligned with the reference area;

an input device operable to transition the access control device between the first condition and the second condition to thereby transition the indicator assembly between the plurality of states; and a detent mechanism engaged between the mounting bracket and the indicator assembly, the detent mechanism configured to selectively resist movement of the indicator assembly from each of the first state and the second state, wherein the detent mechanism comprises a primary engagement feature, a first secondary engagement feature, a second secondary engagement feature, and a bias member urging the primary engagement feature into selective engagement with each of the first secondary engagement feature and the second secondary engagement feature individually;

wherein the detent mechanism has a first engaged state in which the primary engagement feature is engaged with the first secondary engagement feature such that the detent mechanism resists movement of the indicator assembly from the first state;

wherein the detent mechanism has a second engaged state in which the primary engagement feature is engaged with the second secondary engagement feature such that the detent mechanism resists movement of the indicator assembly from the second state; and wherein the detent mechanism has a disengaged state in which the detent mechanism does not resist movement of the indicator assembly.

23. The apparatus of claim 22, wherein the first secondary engagement feature is disengaged from the primary engagement feature when the detent mechanism is in the second engaged state; and wherein the second secondary engagement feature is disengaged from the primary engagement feature when the detent mechanism is in the first engaged state.

24. The apparatus of claim 22, wherein the primary engagement feature is configured to engage no more than one of the secondary engagement features at a time.

* * * * *